United States Patent
Dong et al.

(10) Patent No.: US 10,362,288 B2
(45) Date of Patent: Jul. 23, 2019

(54) METHOD AND SYSTEM FOR IMPROVING DETAIL INFORMATION IN DIGITAL IMAGES

(71) Applicant: SONY CORPORATION, Tokyo (JP)

(72) Inventors: Xiaogang Dong, Boyds, MD (US); Hiroaki Ebi, Tokyo (JP); Jiro Takatori, Cupertino, CA (US); Alexander Berestov, San Jose, CA (US); Kenichi Nishio, Kanagawa (JP); Tak Shing Wong, Fremont, CA (US)

(73) Assignee: SONY CORPORATION, Tokyo (JP)

( * ) Notice: Subject to any disclaimer, the term of this patent is extended or adjusted under 35 U.S.C. 154(b) by 696 days.

(21) Appl. No.: 14/593,133

(22) Filed: Jan. 9, 2015

(65) Prior Publication Data

US 2016/0205331 A1 Jul. 14, 2016

(51) Int. Cl.
| | |
|---|---|
| G06K 9/40 | (2006.01) |
| G06K 9/20 | (2006.01) |
| H04N 13/106 | (2018.01) |
| G06T 5/00 | (2006.01) |
| H04N 13/00 | (2018.01) |
| H04N 5/232 | (2006.01) |

(52) U.S. Cl.
CPC ........... H04N 13/106 (2018.05); G06T 5/003 (2013.01); H04N 5/23229 (2013.01); H04N 2013/0074 (2013.01)

(58) Field of Classification Search
CPC ...................................................... H04N 1/409
See application file for complete search history.

(56) References Cited

U.S. PATENT DOCUMENTS

| | | | |
|---|---|---|---|
| 6,175,658 B1 * | 1/2001 | Kump | G06T 5/50 382/132 |
| 8,374,457 B1 * | 2/2013 | Wang | G06T 5/002 382/260 |
| 8,605,083 B2 | 12/2013 | Muijs | |
| 2007/0146236 A1 * | 6/2007 | Kerofsky | G09G 3/3406 345/7 |
| 2009/0161953 A1 * | 6/2009 | Ciurea | H04N 1/4074 382/172 |
| 2010/0142849 A1 * | 6/2010 | Wang | G06T 5/004 382/275 |
| 2010/0246939 A1 * | 9/2010 | Aisaka | G06T 7/0002 382/156 |

(Continued)

Primary Examiner — Rebecca A Volentine
(74) Attorney, Agent, or Firm — Chip Law Group

(57) ABSTRACT

Various aspects of a method and a system for image processing are disclosed herein. The method includes processing an input image, which comprises structure information and detail information, using image processing (IP) blocks in an image processing pipeline. One or more of the IP blocks, such as the "lossy" IP blocks, process the input image with at least a partial loss of the detail information. By replacing the "lossy" IP blocks with redesigned image processing (IP) modules, the image processing pipeline reduces or avoids such loss of the detail information. A more efficient implementation of the improved pipeline is realized by using a master IP module when the "lossy" IP blocks are reordered and grouped together in the image processing pipeline. The method is further extended to process 3-D images to reduce or avoid loss of detail information in a 3-D image processing pipeline.

19 Claims, 8 Drawing Sheets

(56) References Cited

U.S. PATENT DOCUMENTS

| | | | | |
|---|---|---|---|---|
| 2010/0310189 A1* | 12/2010 | Wakazono | | G06T 5/008 |
| | | | | 382/258 |
| 2011/0268368 A1* | 11/2011 | Toyoda | | G06T 5/002 |
| | | | | 382/264 |
| 2012/0183210 A1* | 7/2012 | Zheng | | G06T 5/009 |
| | | | | 382/162 |
| 2014/0104450 A1* | 4/2014 | Cox | | G06T 1/20 |
| | | | | 348/222.1 |
| 2014/0210813 A1* | 7/2014 | Sato | | H04N 13/0048 |
| | | | | 345/419 |
| 2014/0286575 A1* | 9/2014 | Han | | H04N 19/86 |
| | | | | 382/191 |
| 2015/0243002 A1* | 8/2015 | Hirooka | | G06T 5/008 |
| | | | | 348/241 |
| 2016/0110852 A1* | 4/2016 | Yanai | | G06T 5/003 |
| | | | | 382/264 |

\* cited by examiner

METHOD AND SYSTEM FOR IMPROVING DETAIL INFORMATION IN DIGITAL IMAGES

FIELD

Various embodiments of the disclosure relate to image processing. More specifically, various embodiments of the disclosure relate to processing detailed information in a digital image.

BACKGROUND

Image quality of digital images may be assessed based on various aspects, such as brightness, sharpness, noise, chromatic aberration, optical distortion, and/or the like. In recent years, both pixel counts and pixel densities of digital image sensors in the various image capturing devices have considerably increased. With such increased pixel counts and pixel densities, the image capturing devices are now capable to capture digital images with an increased detail information. Such digital images, as compared with other images with less detail information, are sharper and thus, considered better in terms of image quality. In the following discussions, we may only refer to digital camera as an example of image capturing devices. The similar arguments shall apply to all image capturing devices, such as cameras, camcorders, smart phones, tablets, scanners, and/or the like.

The digital images may contain both structure information and detail information. The structure information may correspond to coarse-granularity information of the digital images. Examples of the structure information may include, but are not limited to, contour edges, luminance information, and chrominance information of one or more objects in the digital images. The detail information may correspond to fine-granularity information of the digital images. Examples of the detail information may include, but are not limited to, various textures of one or more objects in the digital images. For example, when the digital image is an image of a horse, the structure information may correspond to contour edges, luminance information, and chrominance of the horse. The detail information may include the textures of the hair strands and eyelashes of the horse.

Currently, the capability of the modern digital cameras to capture the digital images with high detail information are determined by various factors. Apart from the reduced pixel count and pixel density of one or more image sensors inside the digital camera, there may also be other contributing factors, such as optical limitation, motion blur, and/or image processing inside/outside the digital camera, which may limit the capability of the digital camera to capture the digital images with high detail information.

The optical limitation of the digital camera may limit its capability to capture the digital images with high detail information. Camera lens generally work as optical low pass filters and some high frequency detail information may not pass through the lens and reach the one or more image sensors. The maximum optical resolution allowed by the camera lens is generally smaller than the resolution of the one or more image sensors. Many digital cameras are also equipped with an optical low pass filter in front of the one or more image sensors to suppress Moire artifacts, which may be another important source of the optical limitation.

The motion blur may also affect the capability of the digital camera to capture the digital images with high detail information. The motion blur is generally caused by camera movements and/or object movements. When the motion blur occurs, the detail information of object inside the digital image is essentially low-pass filtered before even reaching the camera lens of the digital camera. Possible solutions to overcome the motion blur may include, but are not limited to, application of optical stabilization, usage of tripod, and/or reduction of shutter time.

The image processing inside/outside the digital camera may further affect its capability to capture the digital images with high detail information. Many image capturing devices, such as the digital cameras, camcorders, and mobile devices, are usually equipped with an image processing unit to convert data from the one or more image sensors to the digital images. The image processing unit may comprise multiple functional blocks and each functional block may perform one of a plurality of image processing functions, known in the art. Examples of such image processing functions may include, but are not limited to, denoising, demosaicing, gamma correction, color space conversion, chromatic aberration correction, optical distortion correction, compression, and/or the like. The functional blocks are generally arranged in a sequential order such that output of a current block is the input of the next block. Such image processing units may be referred to as, "the image processing pipeline".

In certain scenarios, due to implementation of the various functional blocks in the image processing pipeline, detail information of the digital images and/or video frames may be degraded. Such a degradation of the image details may not be desirable. In an exemplary scenario, a denoising block may be implemented to suppress noises, such as a thermal noise, and thereby, improves the image and video quality. While the denoising block suppress the noises through a technique, such as, "smoothing", some detail information may be lost during such "smoothing". In another scenario, a demosaicing block may be implemented to recover full resolution color information, when the color imaging sensors only capture one color per pixel location and rely on information of nearby pixels to recover values of other colors. Such recovery process may be essentially a "smoothing" process, which may reduce detail information of the digital images.

Thus, it may be desirable that the image processing pipeline improves detail information loss of the digital images. There may be other factors, such as pixel count and density of image sensors, optical limitation, and motion blur, that may affect the image processing pipeline, but are not discussed here.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system are provided for image processing substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
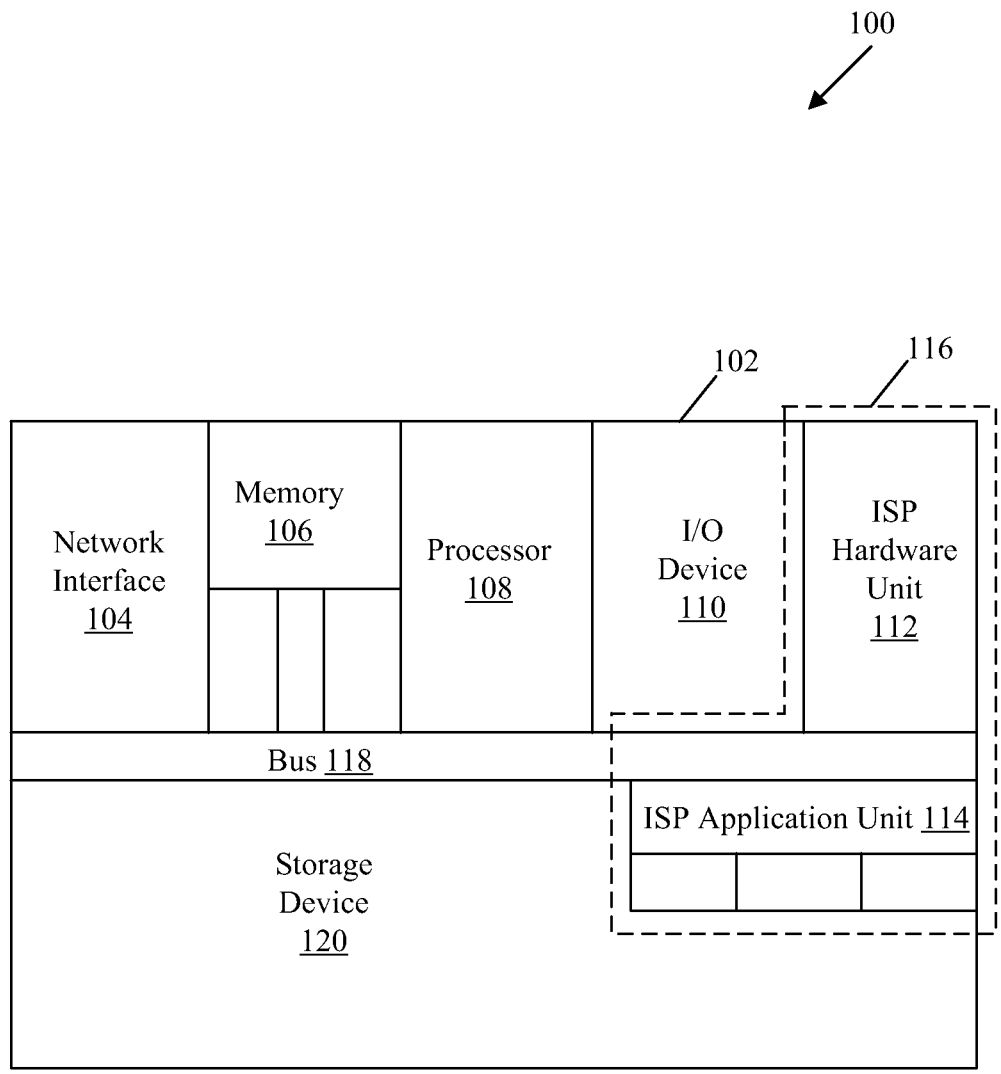
FIG. 1 is a block diagram illustrating an exemplary image processing device in detail, in connection with an embodiment of the disclosure.

Various implementations may be found in a system and/or a method for image processing. The following embodiments are described in sufficient detail to enable those skilled in the art to make and use the disclosed embodiments. It is to be understood that other embodiments would be evident based on the present disclosure, and that system, process, or mechanical changes may be made without departing from the scope of the present disclosure.

In the following description, numerous specific details are given to provide a thorough understanding of the disclosure. However, it may be apparent that the disclosed embodiments may be practiced without these specific details. In order to avoid obscuring the present disclosure, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Where multiple embodiments are disclosed and described having some features in common, for clarity and ease of illustration, description, and comprehension thereof, similar and like features one to another will ordinarily be described with similar reference numerals.

The terms "block", "module", and "master module" referred to herein may include software, hardware, or a combination thereof in the present disclosure in accordance with the context in which the term is used. For example, the software may be machine code, firmware, embedded code, and application software. Also for example, the hardware may be circuitry, processor, computer, integrated circuit, integrated circuit cores, a microelectromechanical system (MEMS), passive devices, environmental sensors including temperature sensors, or a combination thereof.

FIG. 1 is a block diagram 100 illustrating an image processing device 102 in detail, in connection with an embodiment of the disclosure. With reference to FIG. 1, the image processing device 102 may comprise a network interface 104, a memory 106, a processor 108, an Input-Output (I/O) device 110, an image signal processing (ISP) hardware unit 112, an ISP application unit 114, a bus 118, and a storage device 120.

The image processing device 102 may include one or more image processing functions to process digital images and/or videos. The one or more image processing functions may be implemented with hardware, software, or a combination thereof. In accordance with an embodiment, the image processing device 102 may be implemented in computing devices. Examples of the computing devices may include a personal computer, a laptop computer, a computer workstation, a server, a mainframe computer, a handheld computer, a personal digital assistant, a cellular/mobile telephone, a smart appliance, and a gaming console. Examples of the computing devices may further include a cellular phone, a digital camera, a digital camcorder, a camera phone, a music player, a multimedia player, a video player, a digital versatile disc (DVD) writer/player, a television, and a home entertainment system. Examples of the computing devices may further include a point-and-shoot camera, a video camcorder, a single-lens reflex (SLR) camera, a mirrorless camera, and a camera in a mobile device.

The network interface 104 may include a hardware component, such as a network card, based on which the image processing device 102 may communicate with external devices. The network interface 104 may be connected to an Ethernet or other types of local area networks (LAN), such as, Bluetooth, Near Field Communication (NFC), wireless LAN, Long-Term Evolution (LTE), third Generation (3G), Enhanced Data rates for GSM Evolution (EDGE), and/or the like.

The memory 106 may be operable to store one or more optimization algorithms and other image processing algorithms, known in the art. Examples of implementation of the memory 106 may include, but are not limited to, Random Access Memory (RAM), Read Only Memory (ROM), Hard Disk Drive (HDD), and/or a Secure Digital (SD) card.

The processor 108 may include a processing unit with a processing speed selected for data control and computation operations of various hardware units in the image processing device 102.

The I/O device 110 may include one or more input/output units. The one or more input/output units may include a keyboard, a mouse, a monitor, a display, a printer, a modem, a touchscreen, a button interface, and other such input/output units.

The ISP hardware unit 112 may include one or more hardware units, such as a circuitry, a processor, an integrated circuit, and/or an integrated circuit core. The ISP application unit 114 may include software that may correspond to machine code, firmware, embedded code, and application software. The ISP hardware unit 112 and the ISP application unit 114 may include one or more image processing (IP) blocks. Each IP block may perform a pre-determined image processing functionality, and may be implemented in hardware, software, or a combination thereof. A plurality of IP blocks may be arranged in a contiguous manner, such that an output of a current IP block is an input for next IP block, in an image processing pipeline 116. In accordance with an embodiment, the input image of the image processing pipeline 116 may be retrieved from a local image capture device (not shown), via the bus 118. In another embodiment, the input image of the image processing pipeline 116 may be received from a remote image capturing device, via the network interface 104 and then, via the bus 118.

The bus 118 may comprise suitable logic, circuitry, interfaces, and/or code that may be operable to enable a communication between various components inside the image processing device 102. The storage device 120 may include one or more storage units, such as a hard drive, a compact disc read-only memory (CDROM), a compact disc rewritable (CDRW), a digital video disc (DVD), a digital video disc rewritable (DVDRW), and a flash memory card. The storage device 120 and/or the memory 106 may be used to store data processed by one or more of the units, components, and/or IP blocks in the image processing device 102.

Figure 2:
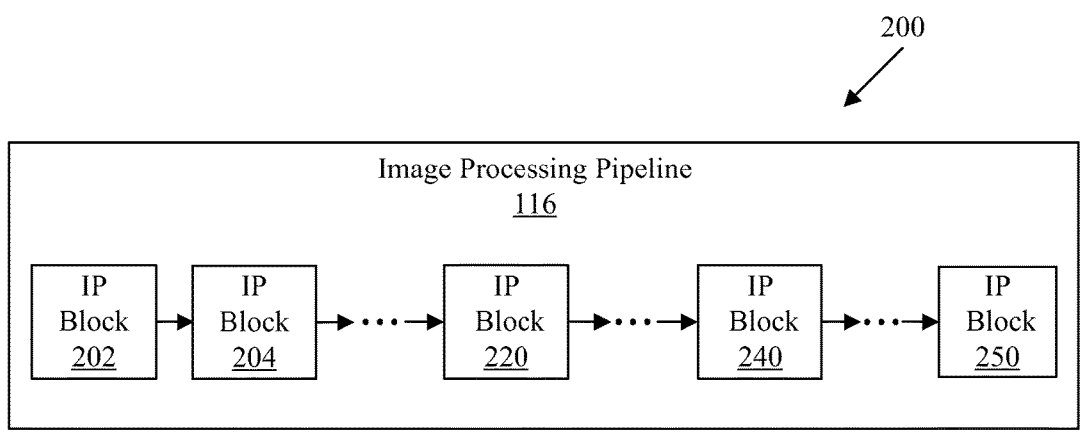
FIG. 2 is a block diagram illustrating an image processing pipeline in an image processing device for processing a two-dimensional (2-D) image, in connection with an embodiment of the disclosure.

FIG. 2 is a block diagram 200 illustrating an image processing pipeline in an image processing device for processing a two-dimensional (2-D) image, in connection with an embodiment of the disclosure. With reference to FIG. 2, there is shown a 2-D image processing pipeline 116 that may process an input image, such as the 2-D image. The 2-D image processing pipeline 116 may comprise a plurality of image processing (IP) blocks, such as IP blocks 202 to 250. Examples of the plurality of IP blocks may include, but are not limited to, a demosaicing block, a noise reduction block, a gamma correction block, an image sharpening block, and a colorspace conversion block. The 2-D image processing pipeline 116 may further include an image compression block and/or an image decompression block to store and/or transmit images. Although for simplicity, FIG. 2 shows only the IP blocks 202 to 250, one skilled in the art may appreciate that the 2-D image processing pipeline 116 may comprise larger number of IP blocks, without deviating from the scope of the disclosure.

With reference to FIG. 2, the plurality of IP blocks, such as the IP blocks 202 to 250, may be arranged in a contiguous manner, such that an output of a current IP block is an input for next IP block. For example, an output of the IP block 202 may be provided, as an input, to the IP block 204.

In accordance with an embodiment, one or more of the plurality of IP blocks in the 2-D image processing pipeline 116 may at least suffer from partial image detail loss for various reasons. In other words, output of such IP blocks may lose certain amount of image details when compared to the corresponding inputs. Such block(s) may be hereinafter referred to as, "lossy" IP block(s). Further, the IP block(s) that do not suffer from such image detail loss, may be hereinafter referred to as, "lossless" IP block(s).

Figure 3:
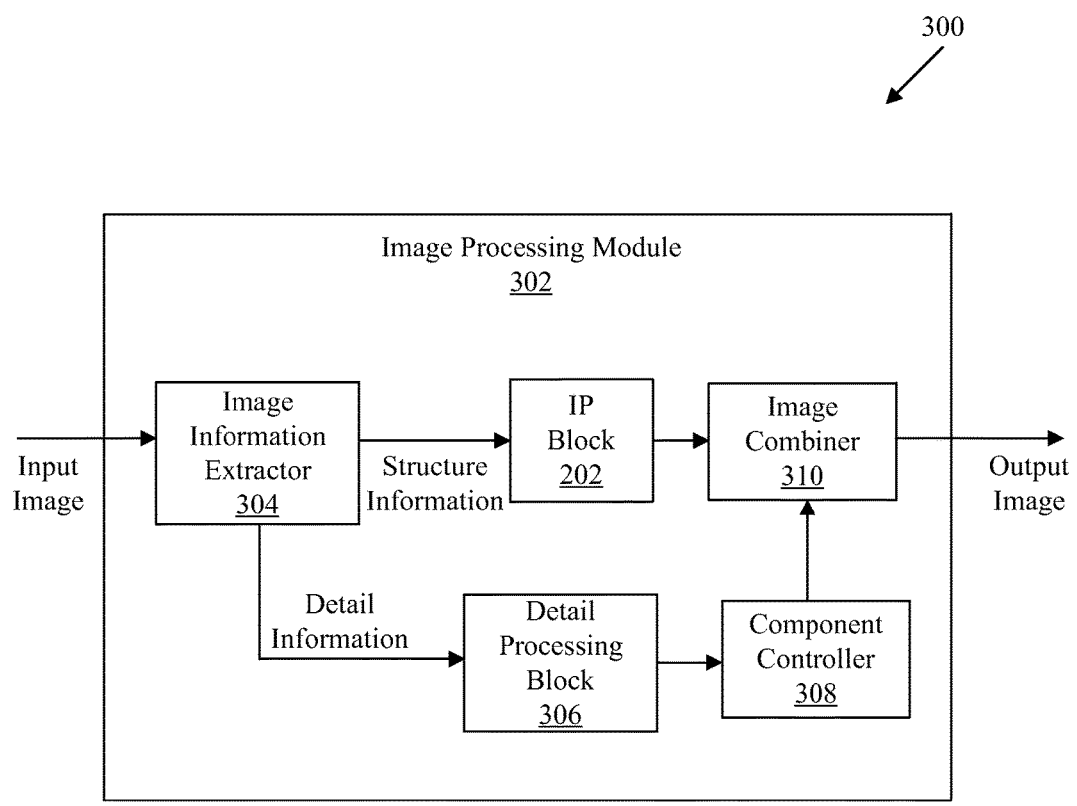
FIG. 3 is a block diagram illustrating an alternative design of an image processing block to reduce or avoid image detail loss if the image processing block is a "lossy" IP block, in accordance with an embodiment of the disclosure.

FIG. 3 is a block diagram 300 illustrating an alternative design of the IP block 202 to reduce or avoid image detail loss if the IP block 202 is a "lossy" IP block, in accordance with an embodiment of the disclosure. FIG. 3 is explained in conjunction with elements from FIG. 1 and FIG. 2. With reference to FIG. 3, there is shown an image processing (IP) module 302 that may replace the IP block 202 in the image processing pipeline 116, as shown in FIG. 1. The IP module 302 may be operable to process an input image and generate an output image. The functionality of the IP module 302 is similar to the functionality of the IP block 202 in the image processing pipeline 116. The IP block 202, as shown in FIG. 3, may be the same as the IP block 202, as shown in FIG. 2. However, since the IP block 202 in FIG. 3 only processes the structure information of input images, a simplified version of the IP block 202 may be alternatively used in FIG. 3. For simplicity, such a difference is not distinguished in FIG. 3 and other following FIGS.

Due to the redesign, the IP module 302 may be free from the image detail loss or suffer less from the image detail loss.

In order to fulfill the same functionality, the IP module 302 may comprise the IP block 202. The IP module 302 may further comprise an image information extractor 304, a detail processing block 306, a component controller 308, and an image combiner 310.

The image information extractor 304 may comprise suitable logic, circuitry, interfaces, and/or code that may be operable to extract the structure information and the detail information from the input image. The structure information may correspond to coarse-granularity information of the input image. Examples of the structure information may include, but are not limited to, a contour edge, luminance information, and/or chrominance information of one or more objects in the input image. The detail information may correspond to fine-granularity information of the input image. Examples of the detail information may include, but are not limited to, various textures of the one or more objects in the input image.

The detail processing block 306 may comprise suitable logic, circuitry, interfaces, and/or code that may be operable to process the detail information of the input image for optimization. In accordance with an embodiment, the detail processing block 306 may be arranged in a parallel configuration with respect to the IP block 202. In accordance with an embodiment, the detail processing block 306 may be operable to optimize the detail information, based on the structure information processed by the IP block 202. The detail processing block 306 may be operable to generate optimized detail information that may correspond to the content of the input image.

The component controller 308 may comprise suitable logic, circuitry, interfaces, and/or code that may be operable to control one or more image characteristics, such as strength and/or frequency, of at least a part of the optimized detail information, which may be processed by the detail processing block 306.

The image combiner 310 may comprise suitable logic, circuitry, interfaces, and/or code that may be operable to combine the output of the IP block 202 and the component controller 308, to generate an output image for the IP module 302.

In operation, the image information extractor 304 may receive the input image from an image source. In accordance with an embodiment, the input image may be a two-dimensional (2-D) image. In accordance with an embodiment, the input image may be a three-dimensional (3-D) image.

In accordance with an embodiment, the image information extractor 304 may extract the structure information and the detail information from the received input image. For example, when the input image is an image of a horse, the image information extractor 304 may extract the structure information, such as contour edges, luminance information and chrominance information, from the input image of the horse. The image information extractor 304 may extract fine-granularity detail information, such as textures of the hair strands and eyelashes, from the input image of the horse.

The image information extractor 304 may be operable to transmit the extracted structure information to the IP block 202. The IP block 202 may process the structure information of the input image and generate a processed image. The image information extractor 304 may be further operable to transmit the detail information to the detail processing block 306. The detail processing block 306 may be operable to process the detail information of the input image. The detail processing block 306 may have the same functionality as the corresponding IP block 202 but may be optimized to process the detail information. In accordance with an embodiment, the detail information processed by the detail processing block 306 may be based on the structure information that is processed by the corresponding IP block 202. For example, the detail processing block 306 may process the detail information of the image of the horse, based on the contour edge in the input image of the horse.

In accordance with an embodiment, the component controller 308 may be operable to provide strength and frequency control of the optimized detail information processed by the detail processing block 306. In accordance with an embodiment, one or more preferences for such strength and frequency control may be received from the viewer. The one or more preferences may be based on one or more of content of the input image, configuration information, model information, mode information, and/or component information of the image processing device 102 that comprises the image processing pipeline 116. The one or more preferences may be based on manual input provided by the viewer. In accordance with an embodiment, the one or more preferences for such strength and frequency control may be received from the viewer, via a slider or a knob control button. The slider or the knob control button may be positioned at the image processing device 102, or on a remote handheld device, wirelessly connected or wired to the image processing device 102. For example, the viewer may increase (or decrease) the high frequency parameter of the optimized detail information processed by the detail processing block 306. Consequently, the output image may become sharper than the input image. In accordance with an embodiment, the component controller 308 may be operable to dynamically set the one or more preferences to control the strength and frequency, based on one or more ambient factors, such as extreme illumination, extreme darkness, and/or the like.

The image combiner 310 may be operable to combine the processed image received from the IP block 202 and the optimized detail information received from the detail processing block 306, via the component controller 308. Based on the combination, the image combiner 310 may be operable to generate the output image. Such an output image may be of a better quality that may not suffer from image detail loss, or may suffer significantly less image detail loss, as compared to the output image of the IP block 202, as shown in FIG. 2.

Figure 4:
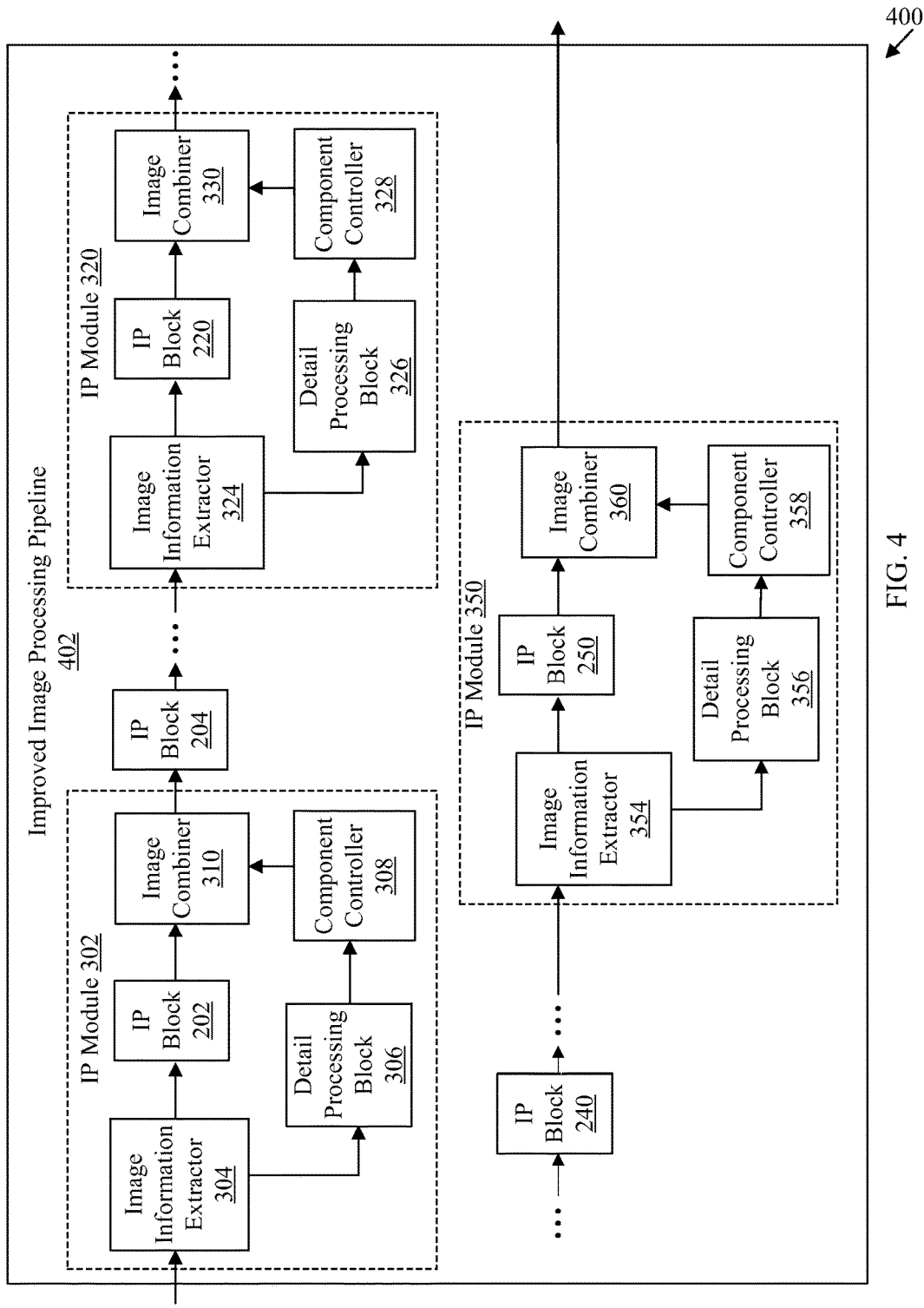
FIG. 4 is a block diagram illustrating a first exemplary implementation of an improved image processing pipeline, in accordance with an embodiment of the disclosure.

FIG. 4 is a block diagram 400 illustrating a first exemplary implementation of an improved image processing pipeline that may be free from the image detail loss or suffer less from the image detail loss, in accordance with an embodiment of the disclosure. FIG. 4 is explained in conjunction with elements from FIG. 2 and FIG. 3. With reference to the FIG. 4, there is shown the improved image processing pipeline 402. The image processing pipeline 116, as shown in FIG. 2, comprises the IP blocks 202 to 250. In accordance with an exemplary scenario, it may be assumed that the IP blocks 202, 220, and 250, may introduce image detail loss while other IP blocks 204 to 218 and 222 to 248, may not introduce the image detail loss. In accordance with such exemplary scenario, the IP blocks 202, 220, and 250, may be hereinafter referred to as, "lossy" IP blocks. Similarly, the other IP blocks 204 to 218 and 222 to 248, may be hereinafter referred to as, "lossless" IP blocks. The improved image processing pipeline 402 may comprise improved IP modules 302, 320, and 350. The improved IP modules 302, 320, and 350 may correspond to the "lossy" IP blocks, such as the IP blocks 202, 220, and 250, respectively.

Although, in accordance with the exemplary scenario, as shown in FIG. 4, only three "lossy" IP blocks are assumed in the image processing pipeline 116, one skilled in the art may appreciate the image processing pipeline 116 may comprise less/more than three "lossy" IP blocks. One skilled in the art may also appreciate the "lossy" IP blocks may be located at the different locations in the image processing pipeline 116.

With reference to the first exemplary implementation, the functionality of the IP module 302 in the improved image processing pipeline 402 may be same as that of the IP block 202 in the image processing pipeline 116. The IP module 302 may replace the "lossy" IP block 202 in the image processing pipeline 116. Similarly, the improved IP modules 320 and 350 in the improved image processing pipeline 402 may replace the corresponding "lossy" IP blocks 220 and 250 in the image processing pipeline 116. In accordance with an embodiment, the improved IP modules 302, 320 and 350 may be free from the image detail loss, as compared to the corresponding "lossy" IP blocks 202, 220 and 250 in the image processing pipeline 116. In accordance with an embodiment, the improved IP modules 302, 320 and 350 may suffer less from the image detail loss, as compared to the corresponding "lossy" IP blocks 202, 220 and 250 in the image processing pipeline 116.

The improved IP module 302 may comprise the image information extractor 304, the IP block 202, the detail processing block 306, the component controller 308, and the image combiner 310. The arrangement and operation of various components of the IP module 302 have been already described in FIG. 3. Similarly, the improved IP module 320 may comprise the image information extractor 324, the detail processing block 326, the component controller 328, and the image combiner 330 and the improved IP module 350 may comprise the image information extractor 354, the detail processing block 356, the component controller 358, and the image combiner 360. The operations and arrangement of various components of the IP module 320 and the IP module 350 may be similar to the operations and arrangement of various components of the IP module 302 that has already been described in detail in FIG. 3.

The functionality of the information extractors 324 and 354 may be similar to the functionality of the image information extractor 304 that has already been described in detail in FIG. 3. The functionality of the detail processing blocks 326 and 356 may be similar to the functionality of the corresponding IP block 220 and 250, respectively, but may be optimized for processing the detail information of the input image. The operation of the detail processing blocks 326 and 356 may be similar to the operation of the detail processing block 306 that has already been described in detail in FIG. 3. The functionality of the component controllers 328 and 358 may be similar to the functionality of the component controller 308 that has already been described in detail in FIG. 3. The functionality of the image combiners 330 and 360 may be similar to the functionality of the image combiner 310 that has already been described in detail in FIG. 3.

In operation, the IP modules 302, 320, and 350, and the "lossless" IP blocks, such as the IP blocks 204 to 218 and 222 to 248, in the improved image processing pipeline 402 may be arranged in a sequential order. The input image of the improved image processing pipeline 402 may be the input of the IP module 302. The output of the IP module 302 may be the input of the "lossless" IP block 204. The output of the "lossless" IP block 204 may be the input to the next "lossless" IP block 206 (not shown). The same operation may be implemented for subsequent "lossless" IP blocks 208 to 218. The output of the "lossless" IP block 218 may be may be the input to the IP module 320. The output of the IP module 320 via some other "lossless" IP blocks may be the input to the IP block 240. The output of the "lossless" IP block 240 via some other "lossless" IP blocks 222 to 248 may be the input to the IP module 350. Finally, the output of the IP module 350 may be the output of the improved image processing pipeline 402.

The IP module 302 in the improved image processing pipeline 402 may replace the IP block 202 in the image processing pipeline 116, as shown in FIG. 2. Due to the improved design, the output of the IP module 302 may be free from the image detail loss or suffer less from the image detail loss, as compared to the output of the IP block 202 in the image processing pipeline 116. The IP modules 320 and 350 may be operable in a similar way such that the corresponding outputs are free from the image detail loss or suffer less from the image detail loss, as compared to the outputs of the "lossy" IP blocks 220 and the IP block 250 in the image processing pipeline 116. FIG. 4 may only assume the three "lossy" IP blocks, such as the IP blocks 202, 220, and 250. After replacing the three "lossy" IP blocks with the corresponding IP modules 302, 320, and 350, respectively, the improved image processing pipeline 402 may be free from the image detail loss or suffer less from image detail loss, as compared to the image processing pipeline 116.

The IP modules 302, 320, and 350 in the improved image processing pipeline 402 may selectively perform targeted optimization of detail information processing of the input image. For example, the detail processing block 306 may perform targeted optimization of detail information processing of the input image whose structure information is processed by the IP block 202. Similarly, the detail processing block 326 may perform targeted optimization of detail information processing of the input image whose structure information is processed by the IP block 220. Similarly, the detail processing block 356 may perform targeted optimization of detail information processing of the input image whose structure information is processed by the IP block 250. Such a targeted optimization of detail information processing may be performed for only "lossy" IP blocks, such as the IP blocks 202, 220, and 250. Other "lossless" IP blocks, such as the IP blocks 204 to 218 and 222 to 248, may not require such an optimized detail information processing.

The improved image processing pipeline 402 may be free from the image detail loss or suffer less from image detail loss, as compared to the image processing pipeline 116, as shown in FIG. 2. However, the improved image processing pipeline 402 may require more hardware and/or software for implementation. For each "lossy" IP block, the improved image processing pipeline 402 may require an image information extractor, a detail processing block, a component controller, and an image combiner. In accordance with an embodiment, the detail processing blocks may vary based on the functionality of the corresponding "lossy" IP blocks while other components, such as the image information extractors, the component controllers, and the image combiners may share similar implementations. In accordance with an embodiment, the other components may be shared to achieve a more efficient implementation of the improved image processing pipeline 402. More details may be discussed in FIG. 5 and FIG. 6.

Figure 5:
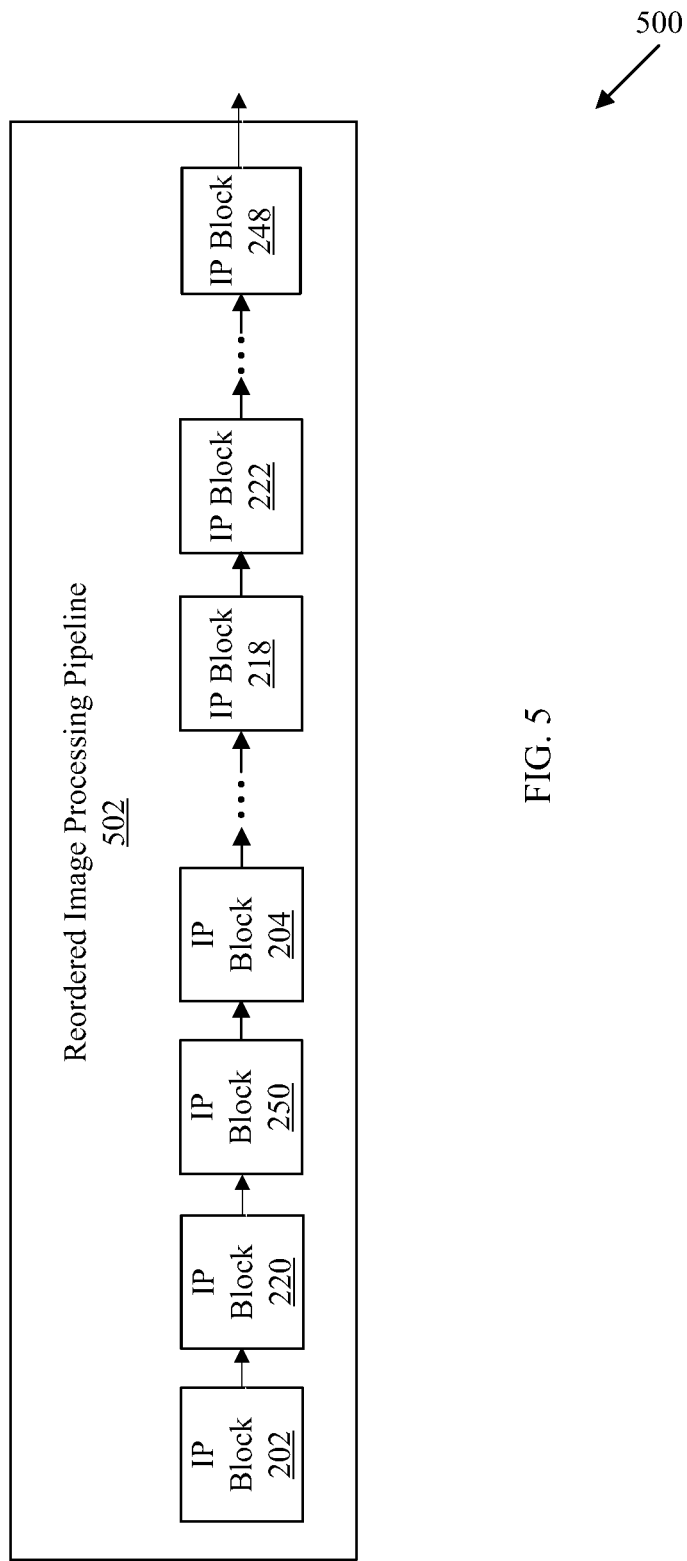
FIG. 5 is a block diagram illustrating a reordered version of the image processing pipeline, in accordance with an embodiment of the disclosure.

FIG. 5 is a block diagram 500 illustrating a reordered version of the image processing pipeline 116 in FIG. 2, in accordance with an embodiment of the disclosure. The reordered image processing pipeline 502 may arrange the "lossy" IP blocks, such as the IP blocks 202, 220, and 250, in a sequence as the initial consecutive IP blocks. Although, as shown in FIG. 5, the reordered image processing pipeline 502 has a different arrangement (or sequence) of the IP blocks, as compared to the image processing pipeline 116, as shown in FIG. 2. Notwithstanding, the output of the reordered image processing pipeline 502 may be identical or sufficiently close to the output of the image processing pipeline 116. When the "lossy" IP blocks are reordered and grouped together, as shown in FIG. 5, there may be a more efficient implementation available than the improved image processing pipeline 402, as shown in FIG. 4.

Although the "lossy" IP blocks are grouped as the initial consecutive IP blocks of the reordered image processing pipeline 502, as shown in FIG. 5, one skilled in the art may appreciate that such regrouping may be placed in the middle or at the back end of the reordered image processing pipeline 502. One skilled in the art may also appreciate that multiple groupings may exist in the same pipeline. For example, one group of the "lossy" IP blocks may be placed in the middle of the reordered image processing pipeline 502 and another group of the "lossy" IP blocks may be placed at the back end of the same reordered image processing pipeline 502. Under rare situations, no reordering or regrouping of the image processing pipeline 116 may be available. In this case, there may not be a more efficient implementation than the improved image processing pipeline 402.

Figure 6:
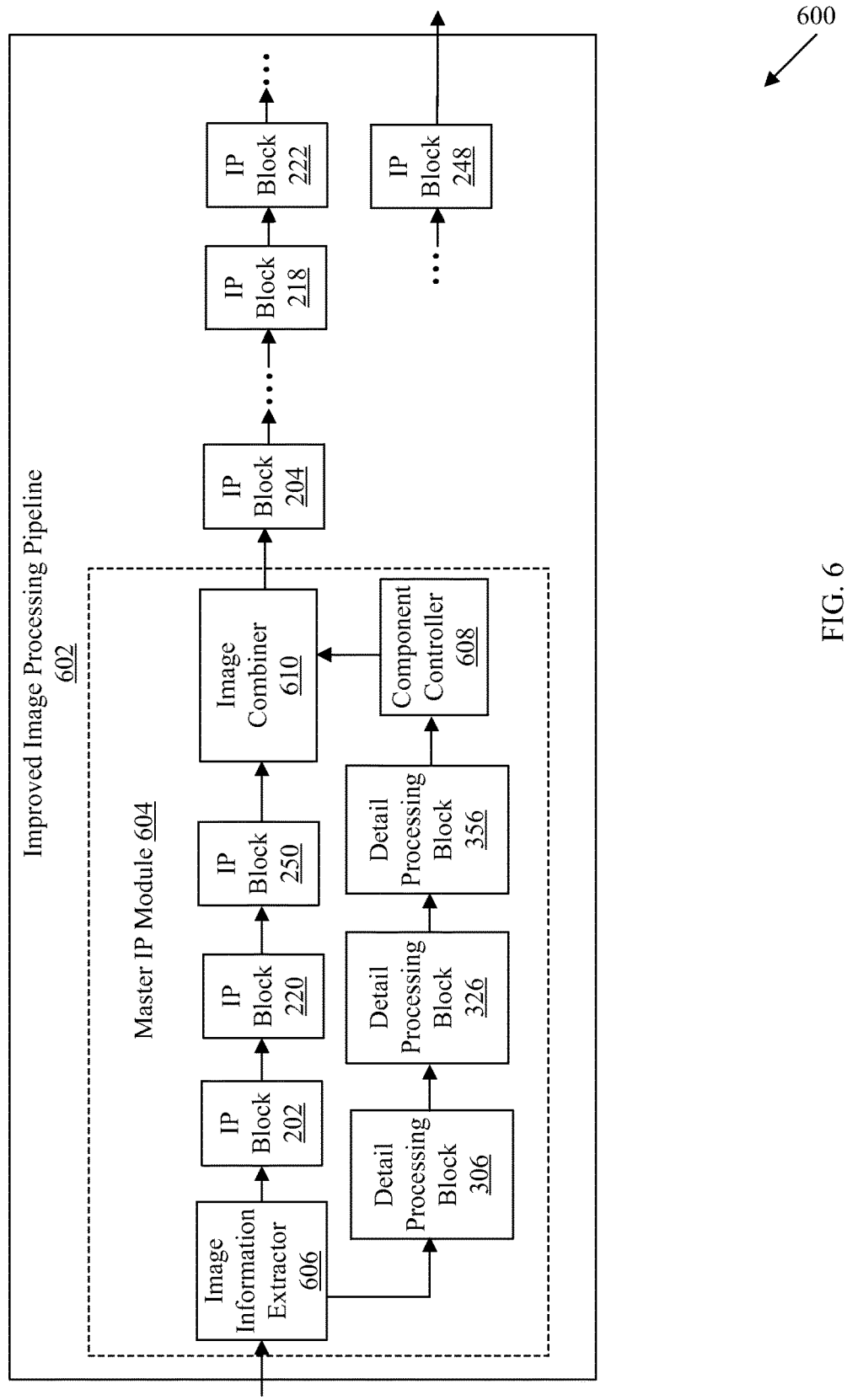
FIG. 6 is a block diagram illustrating a second exemplary implementation of the improved image processing pipeline, in accordance with an embodiment of the disclosure.

FIG. 6 is a block diagram 600 illustrating a second implementation of the improved image processing pipeline when the image processing pipeline 116 in FIG. 2 is reordered as the reordered image processing pipeline 502 in FIG. 5, in accordance with an embodiment of the disclosure. FIG. 6 is explained in conjunction with elements from FIGS. 2 to 5.

With reference to the FIG. 6, there is shown a further improved image processing pipeline 602 that may comprise a master IP module 604. The master IP module 604 may replace the "lossy" IP blocks, such as the IP blocks 202, 220, and 250, in the reordered image processing pipeline 502, as shown in FIG. 5. There is further shown a plurality of "lossless" IP blocks, such as the IP blocks 204 to 218 and 222 to 248. Based on such replacement, the further improved image processing pipeline 602 may be free from the image detail loss or suffer less from image detail loss, as compared to the reordered image processing pipeline 502, as shown in FIG. 5. The master IP module 604 may comprise an image information extractor 606, a component controller 608, and an image combiner 610. The master IP module 604 may further comprise the "lossy" IP blocks, such as the IP blocks 202, 220, and 250, used in the reordered image processing pipeline 502. The master IP module 604 may further comprise the detail processing blocks 306, 326, and 356, used in the improved image processing pipeline 402, as shown in FIG. 4.

Each IP module from the IP modules 302, 320, or 350, in the improved image processing pipeline 402, as shown in FIG. 4, may comprise a separate image information extractor. Such image information extractors may be similar to each other in terms of functionality and implementation. Once the image processing pipeline 116 is reordered as the reordered image processing pipeline 502, as illustrated in FIG. 5, the master IP module 604 may only need a single image information extractor. Similarly, the master IP module 604 may only need a single component controller and a single image combiner, instead of three of each kind, as in the improved image processing pipeline 402 (as shown in FIG. 4). In accordance with an embodiment, the design and the implementation of the image information extractor 606, the component controller 608, and the image combiner 610, may be similar to the ones described in FIG. 4. In another embodiment, the design and implementation of the image information extractor 606, the component controller 608, and the image combiner 610 may be the different from the ones described in FIG. 4.

Each IP block from the "lossy" IP blocks, such as the IP blocks 202, 220, and 250, in the reordered image processing pipeline 502, may have its own functionality. To perform the same functionality, the further improved image processing pipeline 602 may reuse the "lossy" IP blocks, such as the IP blocks 202, 220, and 250. Since the "lossy" IP blocks, such as the IP blocks 202, 220, and 250, only deal with the structure information of the input images in the further improved image processing pipeline 602, simplified versions of such "lossy" IP blocks may be used instead. For simplicity, such differences are not distinguished in FIG. 6.

Each of the detail processing blocks 306, 326, and 356, in the further improved image processing pipeline 602 may have the same functionality as the corresponding "lossy" IP blocks, such as the IP blocks 202, 220, and 250, respectively. However, the detail processing blocks 306, 326, and 356 may be optimized for processing the detail information of the input images. In other words, the detail processing block 306 may correspond to the IP block 202. Similarly, the detail processing block 326 may correspond to the IP block 220. Similarly, the detail processing block 356 may correspond to the IP block 250. The further improved image processing pipeline 602 may reuse the detail processing blocks, 306, 326, and 356, to process the detail information of the input images.

With reference to FIG. 6, the "lossy" IP blocks, such as the IP blocks 202, 220, and 250, may be grouped together as a first set of IP blocks in the master IP module 604. The "lossless" IP blocks, such as the IP blocks 204 to 218 and 222 to 248, may be grouped together as a second set of IP blocks, and placed out of the master IP module 604 of the further improved image processing pipeline 602. In accordance with an embodiment, the master IP module 604 may be inserted at one or more locations in the further improved image processing pipeline 602. The one or more locations may be between two adjacent IP blocks, between two non-adjacent IP blocks, after an IP block, or before an IP block. The location of the master IP module 604 may depend on the particular image processing pipelines. Multiple master IP modules may also be possible for some particular image processing pipelines.

In operation, the image information extractor 606 may transmit the extracted structure information from the input image to the "lossy" IP blocks, such as the IP blocks 202, 220, and 250, arranged in a sequential order. The image information extractor 606 may further transmit the extracted detail information from the input image to the detail processing blocks 306, 326, and 356 arranged in a sequential order. In accordance with an embodiment, the "lossy" IP blocks, such as the IP blocks 202, 220, and 250, may process the structure information of the input image. Each of the detail processing blocks 306, 326, and 356 may be arranged in a parallel configuration with respect to a corresponding one of the "lossy" IP blocks, such as the IP blocks 202, 220, and 250, respectively. The one or more detail processing blocks 306, 326, and 356 may be operable to process the detail information corresponding to each of the "lossy" IP blocks, such as the IP blocks 202, 220, and 250, and generate optimized detail information.

The component controller 608 may be operable to provide strength and frequency control of at least a part of the optimized detail information processed by the one or more detail processing blocks 306, 326, and 356. Based on the strength and frequency control of at least a part of the optimized detail information, the component controller 608 may be operable to generate optimized detail information based on the content of input images, the configuration information of image devices, and the preference of the viewers.

The image combiner 610 may be arranged in such a manner that the image combiner 610 may receive the processed structure information from the IP block 250, and the optimized detail information from the component controller 608. The image combiner 610 may be operable to combine the processed structure information received from the "lossy" IP block 250, and the optimized detail information received from the component controller 608, and may generate a modified image. The image combiner 610 may be further operable to transmit the modified image to the remaining "lossless" IP blocks, such as the IP blocks 204 to 218 and 222 to 248, in the further improved image processing pipeline 602.

The remaining "lossless" IP blocks, such as the IP blocks 204 to 218 and 222 to 248, in the further improved image processing pipeline 602 may be operable to process the modified image and generate an output image. The output of the master IP module 604 in FIG. 6 may be free from the image detail loss or suffer less from the image detail loss, as compared to the output of the IP block 250 in the reordered image processing pipeline 502, as shown in FIG. 5. In accordance with an embodiment, the remaining "lossless" IP blocks, such as the IP blocks 204 to 218 and 222 to 248, in the further improved image processing pipeline 602 may perform a processing of the input image without introducing detail loss to generate the output image. Therefore, it may be appreciated by those skilled in the art that the image quality of the output image, generated by the further improved image processing pipeline 602, in accordance with the present disclosure, may be superior to the image quality of the output image generated by the reordered image processing pipeline 502 of FIG. 5 as well as the corresponding image processing pipeline before reordering, such as the image processing pipeline 116 of FIG. 2. One skilled in the art may also appreciate the fact that the further improved image processing pipeline 602 may be more efficient than the improved image processing pipeline 402 in terms of implementation by reducing the numbers of image information extractors, component controllers, and image combiners.

Figure 7:
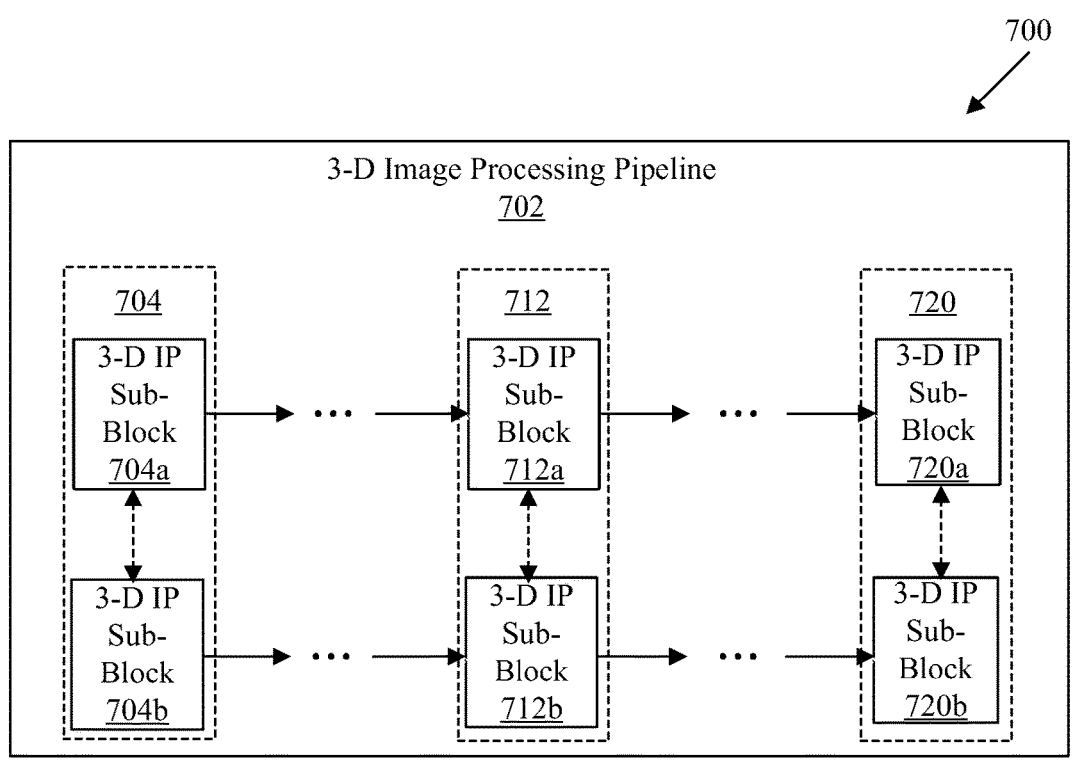
FIG. 7 is a block diagram illustrating a three-dimensional (3-D) image processing pipeline in an image processing device for processing a 3-D image, in connection with an embodiment of the disclosure.

FIG. 7 is a block diagram 700 illustrating a 3-D three-dimensional (3-D) image processing pipeline in an image processing device for processing a 3-D image, in connection with an embodiment of the disclosure. With reference to FIG. 7, there is shown a 3-D image processing pipeline 702 that is operable to process a 3-D input image. The 3-D image processing pipeline 702 may comprise a plurality of 3-D IP blocks, such as 3-D IP blocks 704 to 720. Each of the plurality of 3-D IP blocks may further comprise a pair of 3-D IP sub-blocks. For example, the 3-D IP block 704 may comprise a 3-D IP sub-block 704a and another 3-D IP sub-block 704b. One of the pair of 3-D IP block 704, such as the 3-D IP sub-block 704a, may be operable to process a left-eye input image of the 3-D input image. The other of the pair of 3-D IP block 704, such as the 3-D IP sub-block 704b, may be operable to process a right-eye input image of the 3-D input image. In accordance with an embodiment, the pair of 3-D IP blocks may be operable to communicate with each other.

Although for simplicity, FIG. 7 shows only the 3-D IP blocks 704 to 720, one skilled in the art may appreciate that the 3-D image processing pipeline 702 may comprise a larger number of 3-D IP blocks. With reference to FIG. 7, the plurality of 3-D IP blocks may be arranged in a contiguous manner, such that an output of a current 3-D IP block is an input for next 3-D IP block.

Figure 8:
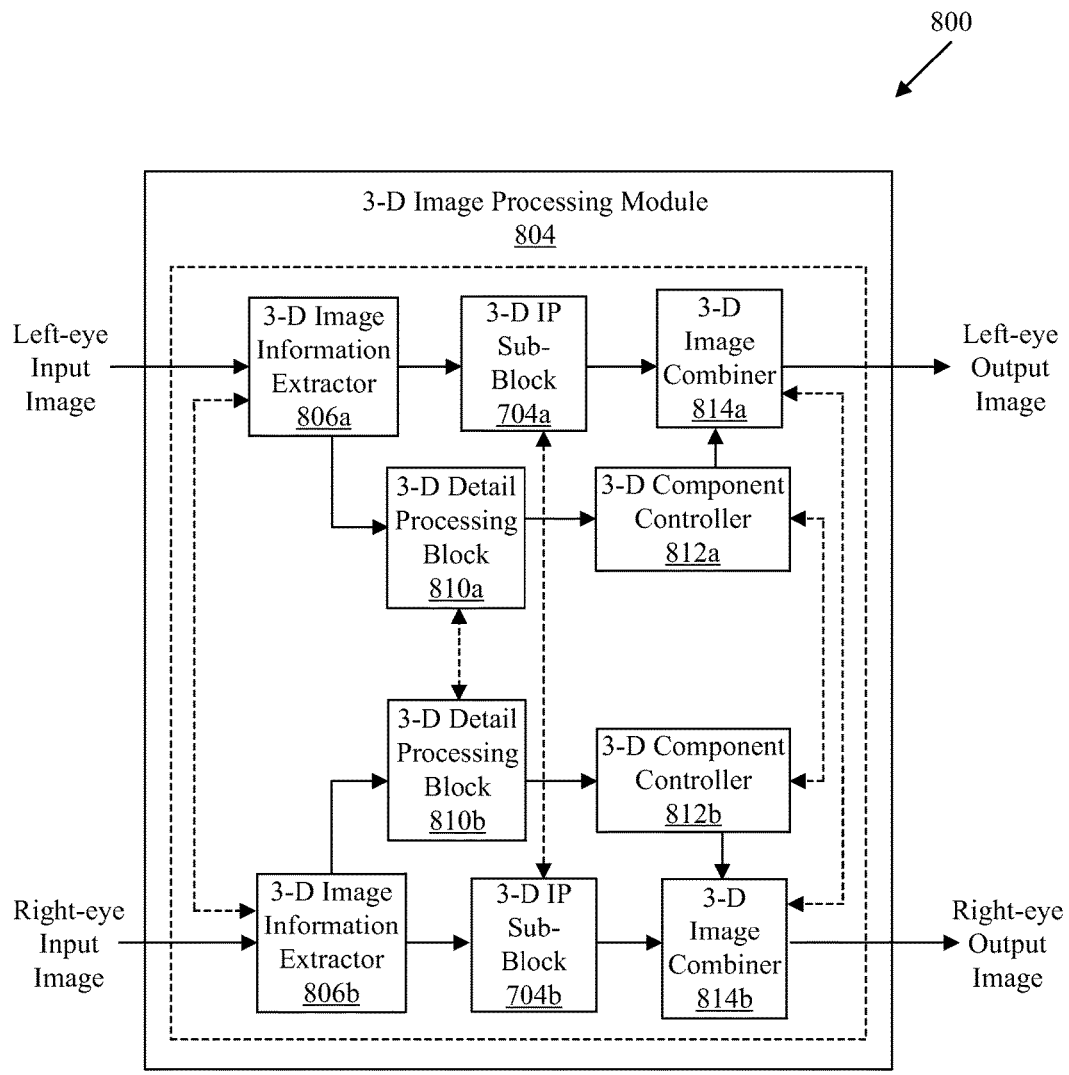
FIG. 8 is a block diagram illustrating an exemplary 3-D image processing module in a 3-D image processing pipeline for a 3-D image, in accordance with an embodiment of the disclosure.

FIG. 8 is a block diagram 800 illustrating an exemplary 3-D image processing (IP) module in a 3-D image processing pipeline for a 3-D image, in accordance with an embodiment of the disclosure. FIG. 8 is explained in conjunction with elements from FIG. 3 and FIG. 7. In accordance with an embodiment, one or more of the 3-D IP blocks in the 3-D image processing pipeline 702 may suffer from image detail loss. Without loss of generality, the 3-D IP block 704 may be assumed to suffer from image detail loss. The 3-D IP block 704 may comprise a pair of 3-D IP sub-blocks, such as a 3-D IP sub-block 704a, and another 3-D IP sub-block 704b. The functionality of the 3-D IP sub-blocks 704a and 704b may be similar to the functionality of the IP block 202 that has been described in detail in FIG. 3, except for the fact that the 3-D IP sub-blocks 704a and 704b process a 3-D image and the IP block 202 processes a 2-D image. A new 3-D IP module 804 may be designed to replace the 3-D IP block 704 in the 3-D image processing pipeline 702 to reduce the image detail loss.

The 3-D IP module 804 may comprise two sets of components, a first set of components for the left-eye input image and a second set of components for the right-eye input image. The first set of components may comprise a 3-D image information extractor 806a, a 3-D detail processing block 810a, a 3-D component controller 812a, and a 3-D image combiner 814a, associated with the 3-D IP sub-block 704a to process the left-eye input image. The second set of components of may further comprise a 3-D image information extractor 806b, a 3-D detail processing block 810b, a 3-D component controller 812b, and a 3-D image combiner 814b, associated with the 3-D IP sub-block 704b to process the right-eye input image.

The functionalities of the 3-D image information extractors 806a and 806b may be similar to the functionality of the image information extractor 304 that has already been described in detail in FIG. 3. The functionalities of the 3-D detail processing blocks 810a and 810b may be similar to the functionality of the detail processing block 306 that has already been described in detail in FIG. 3. The functionalities of the 3-D component controllers 812a and 812b may be similar to the functionality of the component controller 308 that has already been described in detail in FIG. 3. The functionalities of the 3-D image combiners 814a and 814b may be similar to the functionality of the image combiner 312 that has already been described in detail in FIG. 3.

With reference to FIG. 8, the 3-D image information extractor 806a may receive the left-eye input image of the 3-D input image. The 3-D image information extractor 806a may be operable to extract the structure information and the detail information from the left-eye input image. The 3-D image information extractor 806a may be operable to transmit the extracted structure information to the 3-D IP sub-block 704a, and the detail information to the 3-D detail processing block 810a. The 3-D IP sub-block 704a may be operable to process the structure information of the left-eye input image received from the 3-D image information extractor 806a.

The 3-D detail processing block 810a may be operable to process the detail information of the left-eye input image and generate optimized detail information that corresponds to the left-eye input image. In accordance with an embodiment, the 3-D detail processing block 810a may be operable to optimize the detail information of the left-eye input image, based on the structure information of the left-eye input image processed by the 3-D IP sub-block 708a. The 3-D detail processing block 810a may be operable to generate optimized detail information that corresponds to the left-eye input image.

In accordance with an embodiment, the 3-D component controller 812a may be operable to provide strength and frequency control of at least a part of the optimized detail information of the left-eye input image processed by the 3-D detail processing block 810a. In accordance with an embodiment, the one or more preferences for such strength and frequency control may be received from the viewer, via a slider or a knob control button. The slider or the knob control button may be positioned at the image processing device 102, or on the remote handheld device, wired or wirelessly connected to the image processing device 102. In accordance with an embodiment, the one or more preferences may correspond to the complete left-eye input image. In accordance with an embodiment, the one or more preferences may correspond to at least a part of the left-eye input image. In accordance with an embodiment, the 3-D component controller 812a may be operable to dynamically set one or more preferences for strength and frequency control based on one or more ambient factors, such as extreme illumination, extreme darkness, and/or the like.

The 3-D image combiner 814a may be operable to combine the processed structure information received from the 3-D IP sub-block 704a and the optimized detail information of the left-eye input image received from the 3-D component controller 812a, to generate a left-eye output image.

In accordance with an embodiment, the 3-D IP sub-block 704b, the 3-D image information extractor 806b, the 3-D detail processing block 810b, the 3-D component controller 812b, and the 3-D image combiner 814b, may generate a right-eye output image, in the same manner as described with reference to the generation of the left-eye output image in FIG. 8. In accordance with an embodiment, the left-eye input image and the right-eye input image may be processed by the corresponding blocks and components of the processor 108, based on a communication that occurs between the corresponding blocks and components of the 3-D IP module 804. For example, the 3-D detail processing blocks 810a and 810b may communicate with each other, and the 3-D IP sub-blocks 704a and 704b may communicate with each other. Such a communication may facilitate to enhance the 3-D input image.

The left-eye output image and the right-eye output image may be reconstructed in another manner to generate a 3-D output image. Notwithstanding, the disclosure may not be so limited, and other arrangement of the various IP blocks and/or components may be implemented without limiting the scope of the disclosure.

In accordance with an embodiment, one or more 3-D IP blocks in the 3-D image processing pipeline 702 that may introduce a partial loss of the detail information of the left-eye and the right-eye input images, respectively, may be replaced with the corresponding one or more 3-D IP modules. One of the one or more 3-D IP modules, such as the 3-D IP module 804, has been illustrated in FIG. 8. After such replacements, the 3-D image processing pipeline 702 may be free from the image detail loss or suffer less from image detail loss.

In accordance with an embodiment, the 3-D image processing pipeline 702 may be reordered to group the two or more "lossy" 3-D IP blocks together. A master 3-D IP module may be designed to replace the group of "lossy" 3-D IP blocks in the reordered 3-D image processing pipeline. The implementation of the master 3-D IP module may be similar to the implementation of the master IP module 604 that has been illustrated in FIG. 6 for 2-D images. A group of the "lossy" 3-D IP blocks in the reordered version of the 3-D image processing pipeline 702 may be replaced by a master 3-D IP module in the 3-D image processing pipeline 702, to avoid or reduce the loss of the detail information in the 3-D input image.

Such a 3-D image processing pipeline 702 that comprises the 3-D IP modules, instead of the "lossy" 3-D IP blocks, may selectively perform targeted optimization of detail information processing in the 3-D input image. Further, the 3-D image processing pipeline 702 may further comprise the master 3-D IP module, instead of the separate 3-D IP modules for multiple contiguous or non-contiguous 3-D IP blocks. Such multiple 3-D IP modules and/or the single master 3-D IP module may selectively perform targeted optimization of detail information processing of the multiple contiguous or non-contiguous 3-D IP blocks in the 3-D image processing pipeline 702. Such a targeted optimization of detail information processing may be performed for only those "lossy" 3-D IP blocks. Other "lossless" 3-D IP blocks may not require such an optimized detail information processing.

The present disclosure may be realized in hardware, in software, or a combination of hardware and software. The present disclosure may be realized in a centralized fashion, in at least one computer system or imaging device, or in a distributed fashion, where different elements may be spread across several interconnected computer systems. The present disclosure may be realized in an imaging device. The image processing pipeline in such imaging device may be in hardware, in software, or in a combination of hardware and software. The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An image processing method, comprising:
   in an image processing device:
   receiving an input image from an imaging device;
   extracting, by an image extractor, structure information and detail information from said input image,
      wherein said detail information corresponds to fine-granularity information of said input image;
   processing said extracted structure information, by a first image processing (IP) block of a plurality of IP blocks in an image processing pipeline, to generate first processed structure information;
   processing said first processed structure information, by a second IP block of said plurality of IP blocks, to generate second processed structure information,
      wherein a first set of IP blocks of said plurality of IP blocks processes said structure information of said input image with at least a partial loss of said detail information, and
      wherein said first set of IP blocks includes said first IP block and said second IP block;
   processing said extracted detail information by a first detail processing block and a second detail processing block of a plurality of detail processing blocks in said image processing pipeline,
      wherein said extracted detail information is processed by said first detail processing block based on said first processed structure information, and
      wherein said extracted detail information is processed by said second detail processing block based on said second processed structure information;
   receiving a viewer operation through an interface;
   controlling strength and frequency of at least a portion of said processed detail information based on said viewer operation; and
   generating a first output image, by an image combiner, based on at least one of said first processed structure information and said processed detail information by said first detail processing block or said second processed structure information and said processed detail information by said second detail processing block,
      wherein said first output image is without said at least partial loss of said detail information.

2. The image processing method according to claim 1, wherein said received input image is a two-dimensional (2-D) image that comprises said structure information and said detail information.

3. The image processing method according to claim 1, further comprising:
   processing said detail information of said input image based on at least one optimization algorithm,
      wherein each detail processing block of said plurality of detail processing blocks is parallel to a corresponding IP block of said first set of IP blocks.

4. The image processing method according to claim 1, further comprising:
   controlling said strength and said frequency based on at least one preference of a plurality of preferences of a viewer.

5. The image processing method according to claim 1, further comprising:
   controlling said strength and said frequency based on at least one ambient factor of a plurality of ambient factors,
      wherein said at least one ambient factor comprises at least one of an illumination value or a darkness value.

6. The image processing method according to claim 1, further comprising:
processing said first output image without said at least partial loss of said detail information by a second set of IP blocks of said plurality of IP blocks,
wherein said second set of IP blocks is in series with said first set of IP blocks; and
generating a second output image based on said processed first output image.

7. The image processing method according to claim 1, further comprising:
executing said extraction of said structure information and said detail information, said processing of said extracted structure information and said extracted detail information, and said generation of said first output image, in said image processing pipeline, separately for each IP block of said first set of IP blocks in an IP module.

8. The image processing method according to claim 1, further comprising:
executing said extraction of said structure information and said detail information, said processing of said extracted structure information and said extracted detail information, and said generation of said first output image, in said image processing pipeline, collectively for said first set of IP blocks in a master IP module.

9. The image processing method according to claim 1, wherein said plurality of IP blocks are reordered and grouped, into at least one of said first set of IP blocks or a second set of IP blocks, based on at least one of a contiguous arrangement or a non-contiguous arrangement of said plurality of IP blocks.

10. The image processing method according to claim 9, wherein said plurality of IP blocks are grouped, into at least one of said first set of IP blocks or said second set of IP blocks, based on at least one of content of said input image, configuration information of said image processing device, model information of said image processing device, mode information of said image processing device, component information of said image processing device, or said viewer operation.

11. The image processing method according to claim 1, wherein said input image is a three-dimensional (3-D) image, and
wherein said 3-D image comprises a left-eye input image and a right-eye input image.

12. An image processing system, comprising:
an image extractor configured to extract structure information and detail information from an input image,
wherein said detail information corresponds to fine-granularity information of said input image;
a plurality of image processing (IP) blocks in an image processing pipeline,
wherein a first IP block of said plurality of IP blocks is configured to process said extracted structure information to generate first processed structure information,
wherein a second IP block of said plurality of IP blocks is configured to process first processed structure information to generate second processed structure information,
wherein a first set of IP blocks of said plurality of IP blocks is configured to process said structure information with at least a partial loss of said detail information, and
wherein said first set of IP blocks includes said first IP block and said second IP block;
a plurality of detail processing blocks in said image processing pipeline,
wherein a first detail processing block of said plurality of detail processing blocks is configured to process said detail information based on said first processed structure information, and
wherein a second detail processing block of said plurality of detail processing blocks is configured to process said detail information based on said second processed structure information;
an interface configured to receive a viewer operation;
a component controller configured to control strength and frequency of at least a portion of said processed detail information based on said viewer operation; and
an image combiner configured to generate an output image based on at least one of said first processed structure information and said processed detail information by said first detail processing block or said second processed structure information and said processed detail information by said second detail processing block,
wherein said output image is without said at least partial loss of said detail information.

13. The image processing system according to claim 12, wherein each of said plurality of detail processing blocks is parallel to a corresponding IP block of said first set of IP blocks.

14. The image processing system according to claim 12, wherein each detail processing block of said plurality of detail processing blocks is configured to process said detail information based on at least one optimization algorithm.

15. The image processing system according to claim 12, wherein said component controller is further configured to control said strength and said frequency based on at least one preference of a plurality of preferences of a viewer.

16. The image processing system according to claim 12, wherein said component controller is further configured to control said strength and said frequency based on at least one ambient factor of a plurality of ambient factors, and
wherein said at least one ambient factor comprises at least one of an illumination value or a darkness value.

17. A non-transitory computer-readable medium having stored thereon, computer-executable instructions that, when executed by a computer cause said computer to execute operations, said operations comprising:
receiving an input image from an imaging device;
extracting, by an image extractor, structure information and detail information from said input image,
wherein said detail information corresponds to fine-granularity information of said input image;
processing said extracted structure information, by a first image processing (IP) block of a plurality of IP blocks in an image processing pipeline, to generate first processed structure information;
processing said first processed structure information, by a second IP block of said plurality of IP blocks, to generate second processed structure information,
wherein a first set of IP blocks of said plurality of IP blocks processes said structure information of said input image with at least a partial loss of said detail information, and
wherein said first set of IP blocks includes said first IP block and said second IP block;

processing said extracted detail information by a first detail processing block and a second detail processing block of a plurality of detail processing blocks in said image processing pipeline,
- wherein said extracted detail information is processed by said first detail processing block based on said first processed structure information, and
- wherein said extracted detail information is processed by said second detail processing block based on said second processed structure information;

receiving a viewer operation through an interface;

controlling strength and frequency of at least a portion of said processed detail information based on said viewer operation; and generating a first output image, by an image combiner, based on at least one of said first processed structure information and said processed detail information by said first detail processing block or said second processed structure information and said processed detail information by said second detail processing block, wherein said first output image is without said at least partial loss of said detail information.

18. The image processing method according to claim 1, wherein said extracted structure information comprises a contour edge of at least one object in said input image.

19. The image processing method according to claim 18, further comprising:
- processing said extracted detail information based on said contour edge.

* * * * *